(12) United States Patent  
Meyer et al.

(10) Patent No.: US 8,631,559 B2  
(45) Date of Patent: Jan. 21, 2014

(54) METHOD OF ASSEMBLING INDUCTION ROTORS

(75) Inventors: Andrew Meyer, Fortville, IN (US); Phil Tooley, Pendleton, IN (US); Kevin Young, Fairmount, IN (US)

(73) Assignee: Remy Technologies, LLC, Pendleton, IN (US)

( * ) Notice: Subject to any disclaimer, the term of this patent is extended or adjusted under 35 U.S.C. 154(b) by 0 days.

(21) Appl. No.: 13/461,572

(22) Filed: May 1, 2012

(65) Prior Publication Data

US 2013/0291373 A1 Nov. 7, 2013

(51) Int. Cl.
*H02K 15/02* (2006.01)

(52) U.S. Cl.
USPC .......................................... 29/598; 310/211

(58) Field of Classification Search
USPC ............... 29/596–598, 732, 736; 310/156.78, 310/211, 89, 45, 429; 164/109
See application file for complete search history.

(56) References Cited

U.S. PATENT DOCUMENTS

| 2,248,167 | A | * | 7/1941 | Elsey ............................... 29/598 |
| 2,876,371 | A | * | 3/1959 | Wesolowski ........... 310/216.129 |
| 3,685,142 | A | * | 8/1972 | Deming ........................... 29/598 |
| 4,158,225 | A | * | 6/1979 | Hertz ............................. 363/150 |
| 4,490,638 | A | * | 12/1984 | Lind .............................. 310/269 |
| 5,736,707 | A | * | 4/1998 | Nied et al. .................. 219/117.1 |
| 6,088,906 | A | * | 7/2000 | Hsu et al. ...................... 310/211 |
| 6,345,433 | B1 | | 2/2002 | Kliman et al. |
| 6,877,210 | B2 | | 4/2005 | Hsu |
| 6,998,752 | B2 | | 2/2006 | Yasuhara et al. |
| 7,898,138 | B2 | | 3/2011 | Kaihatsu et al. |
| 2002/0153802 | A1 | | 10/2002 | Kliman et al. |
| 2005/0040726 | A1 | | 2/2005 | Sato |
| 2009/0139781 | A1 | | 6/2009 | Straubel |
| 2011/0062819 | A1 | | 3/2011 | Lyons et al. |
| 2011/0175484 | A1 | | 7/2011 | Wang et al. |
| 2012/0034833 | A1 | | 2/2012 | Schaube et al. |

\* cited by examiner

*Primary Examiner* — Minh Trinh

(74) *Attorney, Agent, or Firm* — Bose McKinney & Evans LLP

(57) ABSTRACT

A method of assembling an induction rotor includes inserting a plurality of conductor bars into a stack of disks, placing first and second end rings onto respective axial ends of the stack, thereby inserting ends of the conductor bars into corresponding slots in the respective end rings, compressing the slots against the conductor bars by impacting the end rings, and applying an electric current through the end rings and conductor bars. The compressing and the applying of current bond end rings and conductor bars together by simultaneous mechanical and electrical heat.

18 Claims, 13 Drawing Sheets

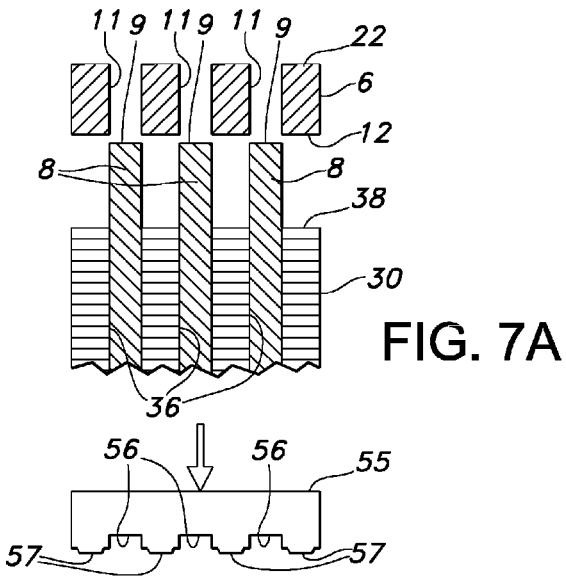
FIG. 7A
FIG. 7B
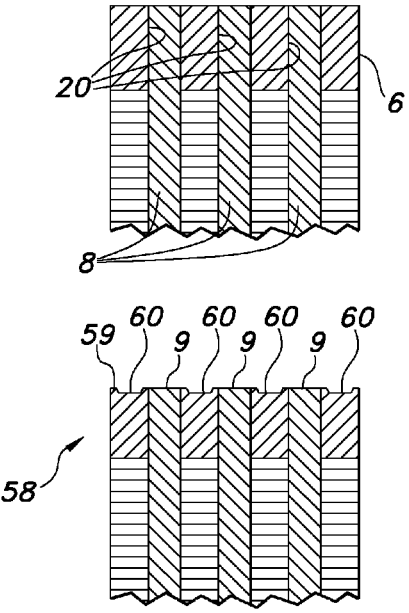
FIG. 7C
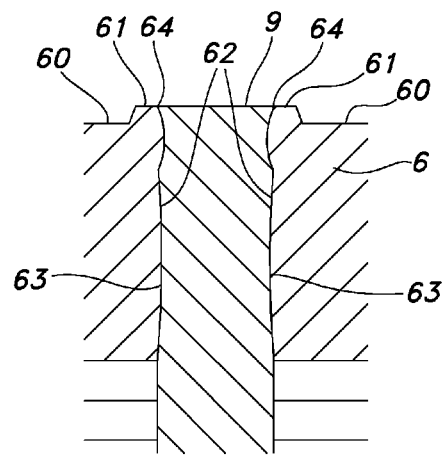
FIG. 7D

METHOD OF ASSEMBLING INDUCTION ROTORS

BACKGROUND

The present invention relates generally to structural improvement of induction type electric machines and, more particularly, to a method of assembling an induction rotor.

An induction motor is an asynchronous electric machine powered by alternating current (AC), where such power is induced in a rotor via electromagnetic induction. For example, polyphase AC currents may be provided to stator windings structured to create a rotating magnetic field that induces current in conductors of a rotor, whereby interaction between such induced currents and the magnetic fields causes the rotor to rotate. Induction motors may have any number of phases. An induction motor may operate as a generator or traction motor, for example when driven at a negative slip.

Rotors of induction motors may conventionally include a cage such as a squirrel cage having parallel axial or skewed conductor bars of copper or aluminum extending between opposite rotor ends and positioned at radially outward locations along the circumference of the rotor. The rotor may have a substantially cylindrical iron core formed as a stack of individual laminated disks, for example disks of a silicon steel material. Each core disk may have axial slots for passing the copper or aluminum bars there-through when the slots are in alignment with one another in a lamination stack. Distal ends of individual conductor bars may be structurally supported and in electrical communication with one another by connection of the respective bar ends to one or more end rings disposed at each rotor end.

Due to the high costs associated with permanent magnet electric motors, electric machines for many different applications are being redesigned to utilize induction rotors. However, conventional induction rotors may have a reduced number of applications due to poor mechanical properties of the chosen material and/or due to inconsistent assembly methods, especially when structural weakness is exacerbated by the size and speed of the rotor. When an induction motor is utilized in a given application such as automotive, the rotor must tolerate high speed rotation and associated large centrifugal force. In addition, high temperatures, potential metal fatigue, and other factors may aggregate to cause structural breakdown resulting in damage or deformation of the rotor. For example, an induction rotor generates higher temperatures within the rotor itself, further reducing mechanical and structural integrity.

There are various conventional techniques that may be used for assembling induction rotors. For example, conventional induction machines may utilize varying grades of aluminum or copper in die-casting the end rings/plates and the conductor bars of the cage as an integral unit. However, conventional die-cast induction rotors may have a reduced number of applications due to poor mechanical properties of the chosen die-cast material and due to problems related to manufacturing. Depending on the grade, the cast material strength may vary significantly. Another conventional induction rotor assembly technique may include forming individual conductor bars, forming two end rings having slots/channels corresponding to the axial slots of the lamination stack, inserting the bars through the axial slots, positioning the respective end rings at the opposite axial ends of the rotor so that the conductor bars pass through the end rings, pressing the end rings axially toward one another, and then welding the end portions of the conductor bars to the end rings. Such welding of conductor bars may produce inconsistent results and poor contact between the end rings and the conductor bars. A further conventional technique for assembling induction rotors may include a so-called "heading" process, where protruding ends of the conductor bars are compressed and flattened against the respective exterior axial surfaces of the end rings. Structural problems may result from a heading operation or other process that directly impacts and axially compresses conductor bars. After being impacted in an axially inward direction, the compressed conductor bars become self-biasing in an axially outward direction and, over time, such conductor bars expand and become loose with respect to the end ring slots.

SUMMARY

It is therefore desirable to obviate the above-mentioned disadvantages by providing a method of assembling an induction rotor that provides consistent contact and secure engagement between conductor bars and end rings. The disclosed embodiments yield improved electrical and mechanical characteristics, reducing or eliminating loose fitting engagement by preventing length contraction and expansion of rotor conductor bars.

According to an embodiment, a method of assembling an induction rotor includes providing a plurality of conductor bars in a rotor core, placing first and second end rings onto respective axial ends of the core, thereby inserting ends of the conductor bars into corresponding slots in the respective end rings, compressing the slots against the conductor bars by impacting the end rings, and applying an electric current through the end rings and conductor bars, whereby the compressing and the applying of current secures the end rings to the conductor bars.

According to another embodiment, a method of assembling an induction rotor includes impacting an end ring for compressing a plurality of end ring slots and thereby locking a corresponding plurality of conductor bars thereto, and passing an electric current through the end ring and conductor bars for heating interfaces between the conductor bars and end ring.

According to a further embodiment, a method of assembling an induction rotor includes impacting an end ring for compressing a plurality of end ring slots and thereby securing a corresponding plurality of conductor bars thereto, and cumulatively providing heat to interfaces between the conductor bars and end ring by the impacting and by passing an electric current through the interfaces.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein:

FIGS. 7A-7D show simplified cross sectional views of a portion of an induction rotor, illustrating a rotor assembly method according to an exemplary embodiment;

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
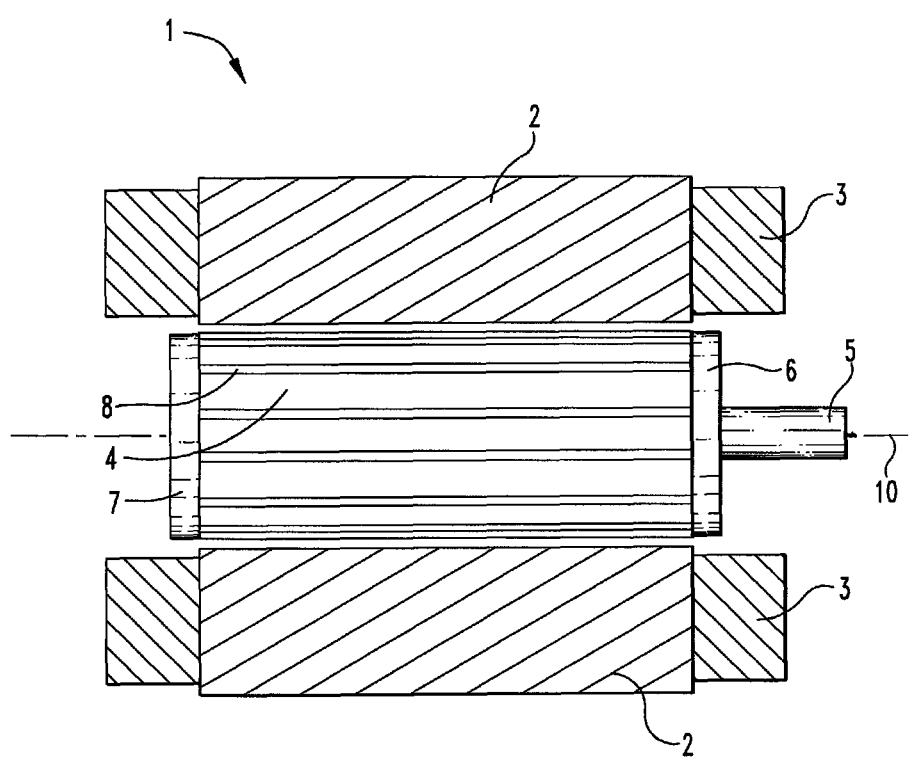
FIG. 1 is a schematic view of an induction type electric machine.

FIG. 1 is a schematic view of an induction type electric machine 1 such an induction motor/generator. In an exemplary embodiment, electric machine 1 may be a traction motor for a hybrid or electric type vehicle. Electric machine 1 has a stator 2 that includes a plurality of stator windings 3 typically disposed in an interior portion thereof. Stator 2 may be securely mounted in a housing (not shown) having a plurality of longitudinally extending fins formed to be spaced from one another on an external surface thereof for dissipating heat produced in the stator windings 3. For example, stator 2 may have a non-magnetic, electrically non-conductive bobbin (not shown) wound with separate phase coils. A rotor 4 has a center shaft 5 and is concentrically mounted within stator 2 so that rotor 4 rotates circumferentially respecting a longitudinal axis of shaft 5. Rotor 4 has a front end ring portion 6 and a rear end ring portion 7 respectively disposed at opposite axial ends of rotor 4, each being formed by a process that includes die-casting. When a voltage from an external power source (not shown) is supplied to the stator windings, stator 2 produces a rotating magnetic field. In operation, voltage is impressed on rotor 4 as an induced voltage. The inductive interaction of the rotating magnetic field with longitudinally extending conductive bars 8 of rotor 4 causes rotor 4 to rotate.

Figure 2:
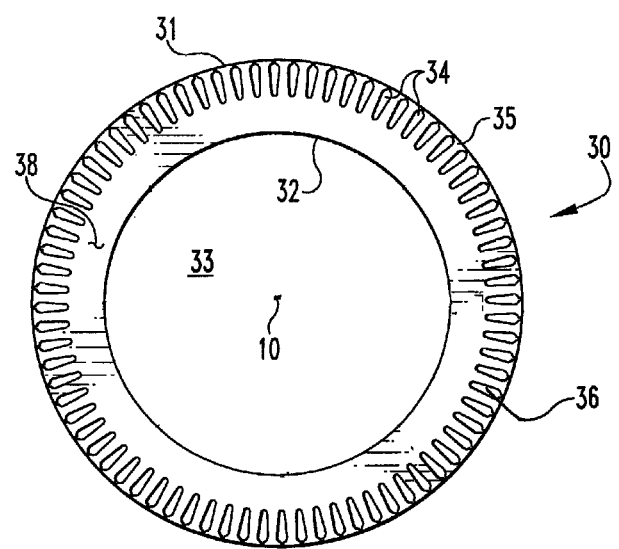
FIG. 2 is a top plan view of an induction motor rotor lamination stack.

FIG. 2 is a top plan view of an induction motor rotor lamination stack 30 formed by stacking individual laminations, each typically made of steel sheet metal and generally shaped as a ring or disk. The laminations may be formed, for example, by a stamping operation. When assembled, lamination stack 30 has a generally columnar shape around central longitudinal axis 10. The laminations are each formed so that assembled lamination stack 30 has a uniform center aperture 33 within which shaft 5 and associated structure may be positioned. Annular inner surface 32 may include a slot (not shown) for engaging a hub, shaft, or other structure of rotor 4. Spaces/holes 34 are typically formed around the periphery of each lamination so that when the laminations are placed in registration with one another by forming lamination stack 30, such spaces form corresponding continuous passages or slots 36 each extending in a generally lengthwise direction through lamination stack 30 proximate the radially outward exterior surface 31. Such slots 36 may be substantially parallel with central longitudinal axis 10 of rotor 4 or they may be skewed. An assembly of laminations may be formed/stacked as a spiral.

In order to reduce vibration, magnetic noise, and unwanted linear and radial movement of the laminations, and/or to reduce adverse effects of variations in dimensions (e.g., thicknesses) of individual laminations, lamination stack 30 may be formed with incremental variations in the shapes of individual laminations. In addition, for example, the laminations may be arranged in groups prior to stack assembly and such groups may include slight variations in shapes of individual teeth 35, whereby a particular resonance is avoided. Lamination stack 30 may be formed with structure physically attached to individual laminations or to stack 30 in order to modify the corresponding electromagnetic profile. An assembly of lamination stack 30 may include bolting, riveting, welding, brazing, bonding, clamping, or staking, whereby mass distribution, elastic distribution, damping, and electromagnetic profile are affected. The electromagnetic structure may also be affected, for example, by selection of the particular interference fit used for staking adjacent laminations, and by the amount of force used by a staking punch for radially compressing a boss (not shown) of a lamination within a hole of an adjacent lamination.

Figure 3A:
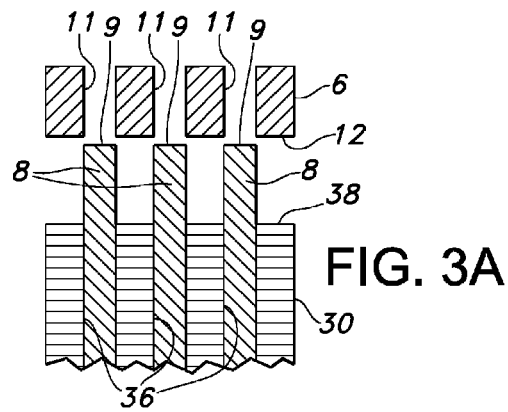
FIGS. 3A-3D show simplified cross sectional views of a portion of an induction rotor, illustrating an exemplary rotor assembly method.

FIGS. 3A-3D each show a simplified cross sectional view of a portion of an induction rotor, and are provided for illustrating an exemplary assembly method. As shown in FIG. 3A, a lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 6 has a plurality of clearance holes/slots 11 formed around a circumference thereof and aligned with corresponding channels 36 and conductor bars 8. End ring 6 is placed so that conductor bars 8 pass through slots 11, and is seated when axially inward facing surface 12 of end ring abuts top surface 38 of lamination stack 30. When conductor bars 8 are inserted into end ring 6, there are gaps/voids 19 in slots 11 that provide clearance between a given conductor bar 8 and slot 11. Portions of conductor bars 8 may be tapered or shaped in any appropriate manner.

Figure 3B:
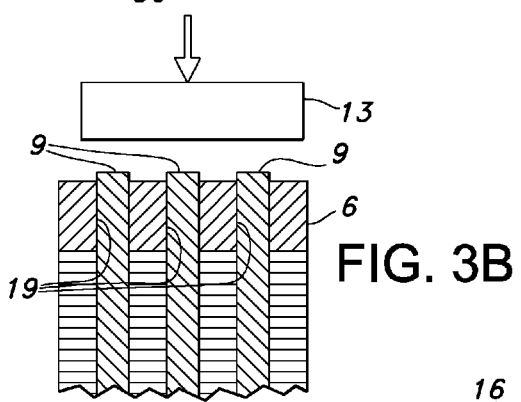

When end ring 6 has been seated and is flush with lamination stack 30, a punch 13 impacts conductor bar ends 9 as shown in FIG. 3B. Conductor bars 8 are formed of a ductile material such as copper that deforms and does not significantly fracture when the force of the impacting from punch 13 is applied. The applied force exceeds the yield strength of conductor bars 8, whereby the copper or other material is compressed into end ring holes 11 to significantly improve contacting between end ring 6 and individual conductor bars

Figure 3C:
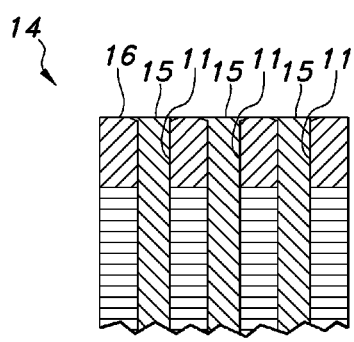
Figure 3D:
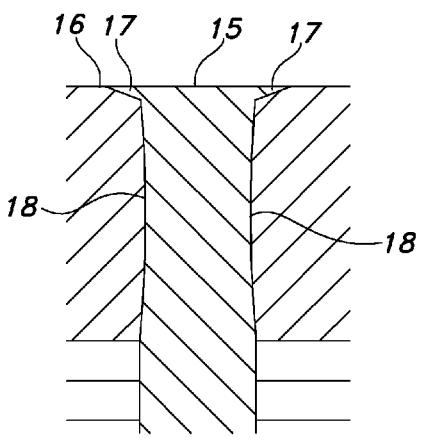

8. The amount of force and velocity thereof are adjusted to optimize the filling of end ring holes 11 with the compressed copper of conductor bars 8. FIGS. 3C and 3D each show a cross section of a portion of the resultant headed assembly 14 after the impacting. Compressed/flattened conductor bar heads 15 become approximately flush with axially outward facing end ring surface 16, and a flange 17 or similar portion may be formed for a given conductor bar 8, depending on various factors such as the amount of conductor bar 8 being compressed into end ring hole 11, the velocity of punch 13, the amount of clearance between conductor bar 8 and end ring hole 11 prior to the impacting, the ambient and/or applied heat, the ductile properties of conductor bar 8 and end ring 6, and others. The deformed end ring material optimally completely fills the corresponding clearances between end ring 6 and circumferential portion(s) 18 of conductor bars 8 that existed prior to the impacting, so that portions 18 are in tight abutment with compressed surfaces of end ring holes 11, whereby electrical resistance is reduced and rotor efficiency is increased.

The induction rotor assembly method illustrated in FIGS. 3A-3D is problematic because the impacting causes a compression of conductor bars 8 in the lengthwise or axial direction. When conductor bars 8 subsequently expand in the opposite lengthwise or axial direction, they may become loose, which results in reliability problems for rotor 4. This lengthwise expansion of rotor bars 8 may also be different for different ones of the plurality of rotor bars 8, whereby the respective tension, tightness, and integrity of mechanical engagement, and the associated performance of individual conductor bar portions may be inconsistent. Such problems are exacerbated by vibration, heat, and other operational conditions experienced by electrical machine 1, resulting in a reduction of machine life. In addition, when heat is applied during the rotor assembly process, ancillary rotor parts may be affected and additional manufacturing operations may be necessitated, such as those involving ovens, venting, safety and personnel protections, environmental protections, costs, cooling times and cooling areas, fixturing, and others.

Figure 4A:
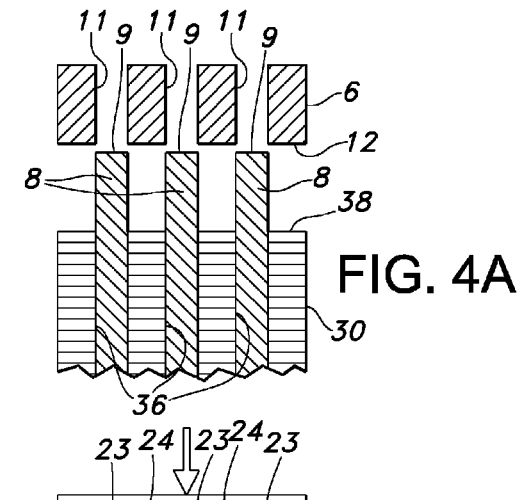
FIGS. 4A-4D show simplified cross sectional views of a portion of an induction rotor, illustrating a rotor assembly method according to an exemplary embodiment.

FIGS. 4A-4D each show a simplified cross sectional view of a portion of an induction rotor, and are provided for illustrating an assembly method according to an exemplary embodiment. As shown in FIG. 4A, a lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 6 has a plurality of clearance holes/slots 11 formed around a circumference thereof and aligned with corresponding channels 36 and conductor bars 8.

Figure 4B:
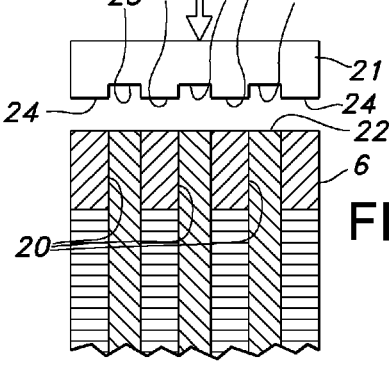

FIG. 4B shows end ring 6 placed so that conductor bars 8 pass through slots 11, whereby end ring 6 is seated when axially inward facing surface 12 of end ring 6 abuts top surface 38 of lamination stack 30. When conductor bars 8 are inserted into end ring 6, there are gaps/voids 20 in slots 11 that provide clearance between a given conductor bar 8 and slot 11. When end ring 6 has been seated and is flush with lamination stack 30, a punch 21 impacts the top surface 22 of end ring 6. Punch 21 has cavities/indented portions 23 that are aligned with conductor bars 8 so that when punch 21 impacts end ring 6, conductor bars 8 are not directly impacted. Instead, contacting surface(s) 24 of punch 21 strikes end ring 6 and compresses end ring material into voids 20. End rings 6, 7 and conductor bars 8 are formed of a ductile material such as copper that deforms and does not significantly fracture when the force of the impacting from punch 21 is applied. The applied force exceeds the yield strength of end ring 6, whereby the copper or other material is compressed into end ring voids 20 to significantly improve contacting between end ring 6 and individual conductor bars 8. The amount of force and velocity thereof are adjusted to optimize the filling of end ring voids 20 with the compressed copper of end ring 6.

Figure 4C:
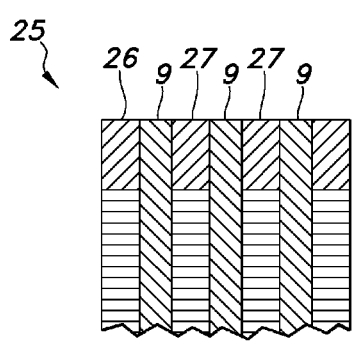
Figure 4D:
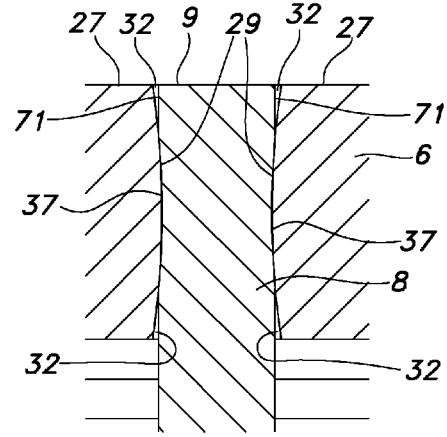
Figure 5:
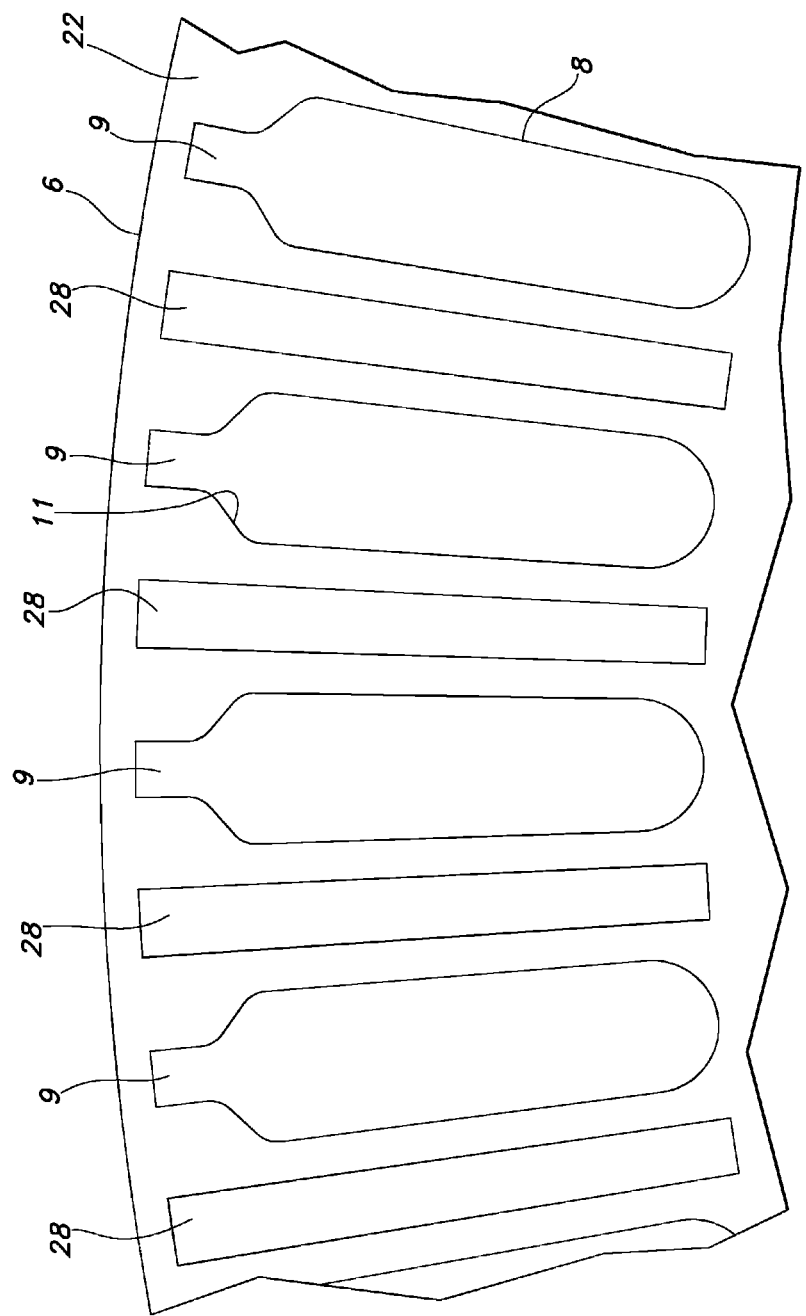
FIG. 5 is a partial top plan view of an induction rotor showing relative positions of conductor bars and rectangular impact target areas interposed therebetween, according to an exemplary embodiment.

FIGS. 4C and 4D each show a simplified cross section of a portion of the resultant assembly 25 after the impacting. The compressed top surface 26 includes compressed portions 27 between adjacent conductor bars 8. For example, FIG. 5 is a top plan view of a portion of assembly 25 showing impact areas 28 that are targeted by contacting surfaces 24 of punch 21. Such contacting surfaces are structured as rectangles for striking end ring top surface 22 between adjacent ones of end ring slots 11. When top surface 22 of end ring 6 is substantially flat prior to the impacting, impact areas 28 may become concave surfaces having the same shape as the corresponding rectangular contacting surfaces 24. When top surface 22 has protrusions in impact areas 28 prior to the impacting, then the impacting from punch 21 may result in compressed end ring surface 26 becoming substantially flat. The surface area and shape of the contacting surface(s) 24 of punch 21 may optionally be the same as that of top surface 22 of end ring 6. For example, contacting surface 24 may be a round disk having indented cavities 23 aligned with and shaped the same as corresponding ones of end ring slots 11, and a plan view of such an impacting surface may be substantially similar to that shown in FIG. 2. In such a case, compressed top surface 26 may become uniform and substantially flat. The impacting of end ring 6 compresses the relatively soft metal (e.g., copper) so that the metal is pressed around conductor bars 8 without substantially impacting conductor bar ends 9. Metal of end ring 6 is pressed against conductor bar 8 to greatly reduce resistivity along main body portion 37 of conductor bar 8. Very slight gaps/voids 32 may remain at given portions of the end ring/conductor bar interface, depending on the choice of contacting surfaces 24, pre-impact end ring surface shape(s), and parameters such as ambient and/or applied heat, impact force, deformation volume, initial gap volume, conductor bar/end ring slot shapes, punch velocity, ductile properties, and other related factors. As shown in FIG. 4D, the compressing acts to force end ring material 29 against main body portion 37, whereby main body portion 37 may then have a smaller cross sectional profile area compared with that of conductor bar end 9. The axial length of conductor bar 8 may be chosen so that conductor bar end 9 is below end ring surface 22 prior to the compressing, and then becomes flush with compressed top surface 26. As a result of the compressing, main body portion 37 is in tight abutment with the surface of end ring holes 11, whereby electrical resistance is reduced and rotor efficiency is increased.

In combination with the impacting of end ring 6, heating of the interfaces between slots 11 and conductor bars 8 provides further bonding of such interfaces. For example, when electric current flows from end ring 6 through conductor bars 8 to end ring 7, the interfaces are locations having the highest electrical resistance because of any spaces/voids therein. Such resistance to the passage of electrical current creates heat at the interfaces. The heated interfaces have softened end ring material (e.g., copper) that may be either melted or unmelted. When the end ring base material is melted by the heating, a weld nugget at the interface reduces electrical resistance by filling in the spaces/voids. When the base material is unmelted, the electrical current may be sufficient to melt a brazing material, or the electric current may simply soften the base material so that compressed surfaces of the interface are urged together to remove spaces and voids. The compressing of end ring base material around conductor bars 8 may be performed before, during, and/or after the flow of electric current through the interfaces. For example, after performing the process illustrated by FIGS. 4A-4D, applying a sufficient electric current between end rings 6, 7 welds conductor bars 8 to end ring material 29. Arcing may occur across voids 32. The heat necessary to locally melt the interfacing surfaces may be obtained from the resistance to flow of one or more short pulses of high electric current at low voltage, and the electrodes may provide clamping pressure and/or impacting force.

The high current level for a brief amount of time may be designed to be sufficient to weld conductor bars 8 to end rings 6, 7 while avoiding excessive temperature and excessive deformation. For example, current may be 5000 to 100,000 amperes, voltage may be 3.0 to 10.0 volts, and duration may be less than two seconds with a duty cycle of five to ten percent. Any other suitable electric current may be utilized, depending on a particular application. For example, high frequency brazing/welding may be utilized when only a shallow depth weld is required after an end ring compression process. Impacting and clamping surfaces may be chosen for aligning the interfacing surfaces, for applying pressure to develop proper surface resistance, for containing molten metal, for forging the interfacing material, for transferring electric current, for dissipating excessive heat, and/or for cooling (e.g., by being water cooled). Processing may include post weld heat cycling, and impacting and/or pressure forging performed at any time. For example, a softening current may be applied, followed by an impacting that compresses the softened metal of end rings 6, 7 against conductor bars 8.

In another example, interfacing portions of conductor bars 8 may be coated with a very thin layer of a brazing material so that heating of the interfaces melts such brazing material without melting the end ring base material. In such a case, a lower power level is used for a corresponding lower interface temperature. The thin layer has a higher resistance compared with the end ring base material (e.g., copper), and this higher resistance causes heat at the interface to localize. For example, an interface temperature may be above 450 degrees C. and below the solidus of the base metal. At the elevated interface temperature, the end ring base material is softened. A concurrent or subsequent impacting of an end ring portion in proximity to the softened interface acts to produce a higher degree of coalescence or intimate joining by metallurgical union. The brazing material may be applied to interface locations of conductor bars 8 by sputtering to prevent contamination, oxidation, and other potential problems, although plating, vapor deposition, or another process may alternatively be used. By way of non-limiting example, a brazing material may include silver, phosphorous, silicon, copper, nickel, tin, aluminum, magnesium, gold, zinc, cadmium, and various alloys known in the art and typically chosen depending on melting temperature range and flow properties at high temperature. In contrast to conventional brazing, a flux, and subsequent removal of its residue, may be unnecessary when the brazing material already uniformly covers the interface area and when the brazing material is being provided for localizing heat rather than for being distributed by capillary action.

Figure 10A:
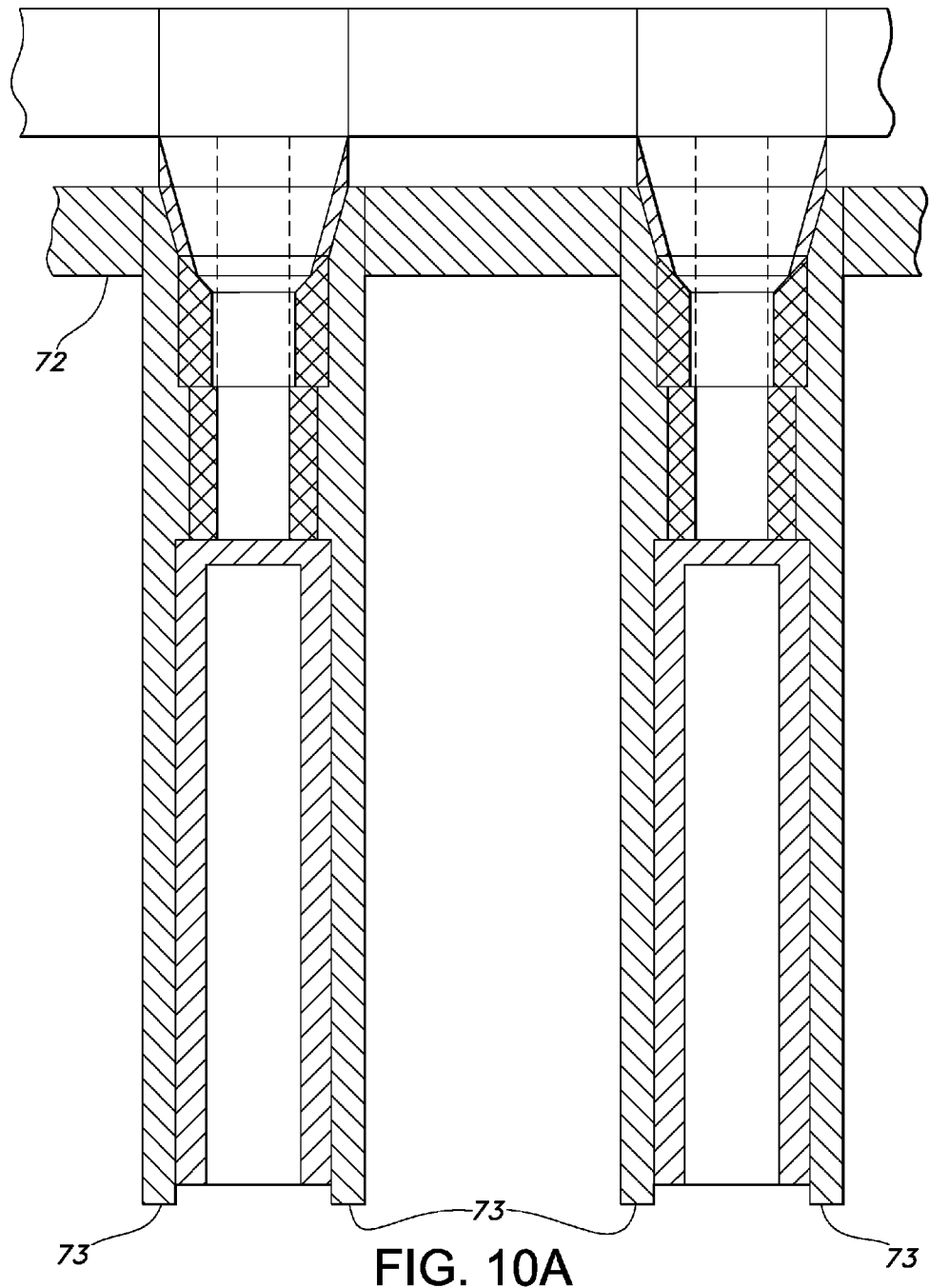
FIGS. 10A and 10B are partial cross sectional views of apparatus having an impacting ring with impacting surfaces and having a retractable electrode ring with individual electrodes, according to an exemplary embodiment.
Figure 10B:
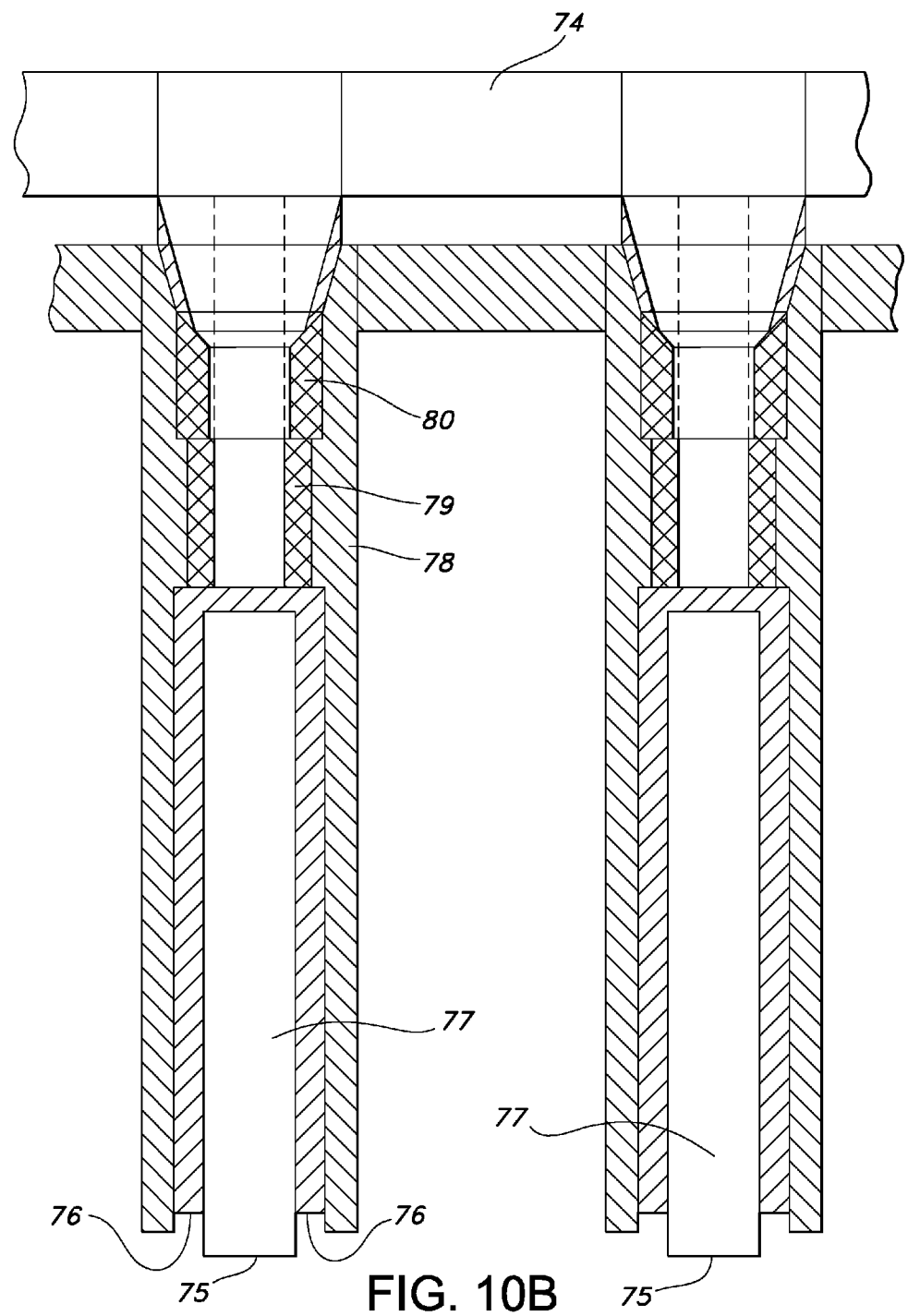

In a further example, a lower electric current is passed through the slot/conductor bar interfaces to soften the adjacent material, a first impacting is performed for compressing slots 11 around conductor bars 8, and a higher electric current is passed through the compressed interfaces to resistance weld without substantially arcing. FIG. 10A is a cross-sectional elevation view of an exemplary impacting ring 72 having impacting surfaces 73 that may be defined for compressing end ring material by striking an end ring 6, such as in impact areas 28. For example, impacting ring 72 may be driven axially inward for such impacting. FIG. 10B shows an exemplary electrode ring 74 in a welding position, with electrode contacting surfaces 75 extended. An insulating sleeve 76 prevents electrodes 77 from shorting against the body 78 of impacting ring 72. An inner damper 79 is provided to communicate with an outer damper 80 to modulate the movement of electrode 77 within body 78. Dampers 79, 80 may include springs, hydraulic fluid, mechanisms, and other devices for assuring that electrodes 77 are not damaged by extension and retraction. For example, electrode ring 74 may be moved axially inward for performing an electric current flow through interfaces of conductor bars 8 and end ring 6. FIGS. 10A and 10B are illustrative and are not drawn to scale. The impacting of FIG. 10A and the current flow of FIG. 10B may be performed in sequence or simultaneously. In all cases, heat is proportional to the product of resistance, the square of current, and time. The highest heat occurs where the resistance is at a maximum, which is at the conductor bar/end ring interfaces where such heat is needed most. The impacting type compression greatly reduces resistance at the interface, and thereby substantially reduces the amount of electric current necessary for forming an induction rotor having high efficiency. The heating provided by the electric current may be adjusted to a minimum when forging of heated, softened end ring material by the impacting is sufficient to create a strong, reliable bond.

Figure 11:
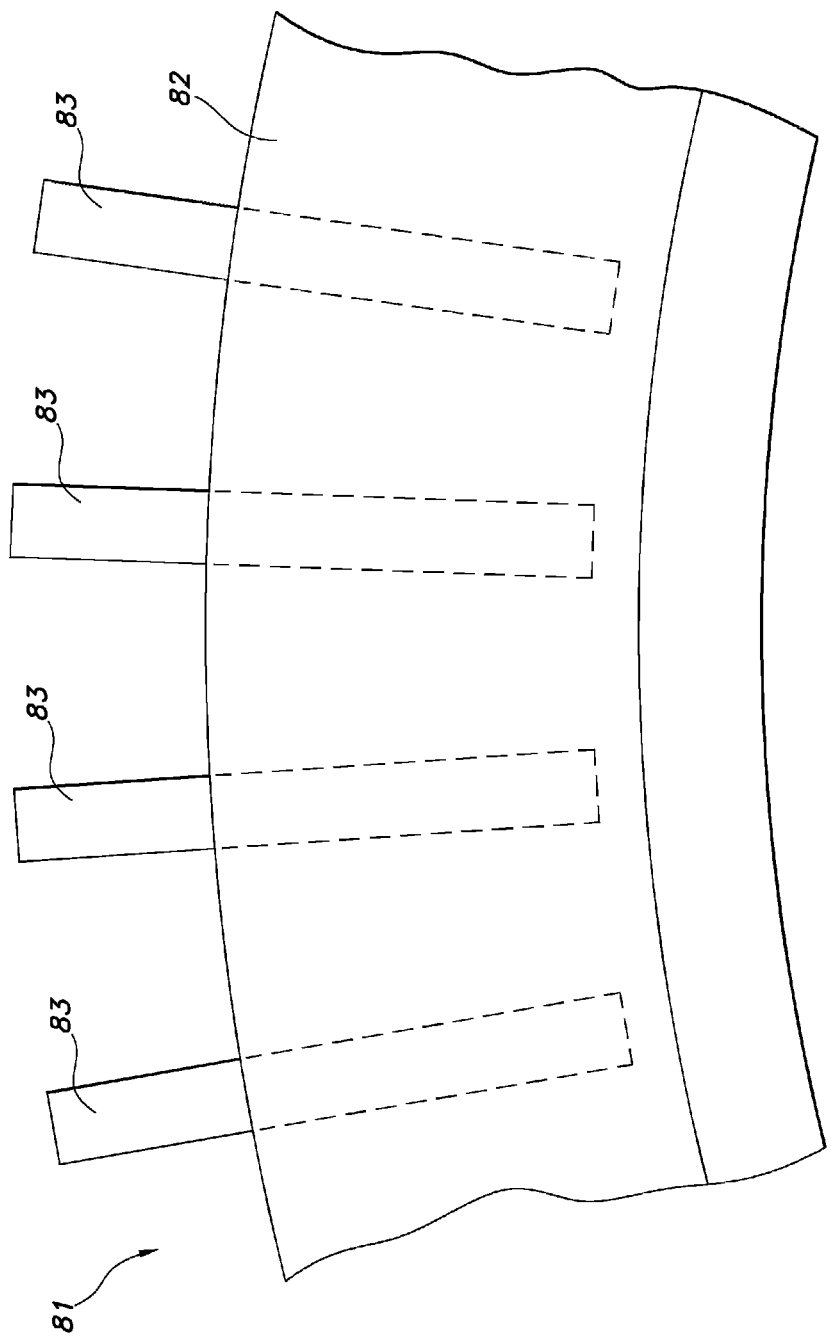
FIG. 11 is a partial top plan view of an electrode ring having a number of impacting feet extending radially and correspondingly aligned with target impact areas of an induction rotor end ring.

In yet another example, an impacting surface may act as an electrode. FIG. 11 is a partial top plan view of an integrally formed electrode ring 81 having a main body 82 and a number of impacting feet 83, extending radially and correspondingly aligned with ones of the impact areas (e.g., impact area 28 of FIG. 5). In operation, a press is mechanically connected to, and electrically insulated from, electrode ring 81. An electric current source (not shown) is electrically connected to electrode ring 81, and is electrically connected to a second electrode ring 81 provided to strike end ring 7 at the opposite axial end of rotor 4. The press exerts force that causes impacting feet 83 to strike the impact areas, thereby compressing end ring material around conductor bars 8 in each slot 11. The electric current source turns on the current for a short time, before, during, or after the impacting. Conductor bars 8 and surrounding end ring material are both mechanically and electrically heated, the combination of compressing and welding providing effective current paths through the individual welds. High current for a brief amount of time is sufficient to weld conductor bars 8 to end ring 6 while avoiding excessive temperature or deformation to end rings 6, 7 or conductor bars 8. The resulting interfaces have tight bonding and provide a slight tension into conductor bars 8, thereby enhancing the stability of rotor 4. Such tension seeks to retract conductor bars 8 inwardly, which is prevented by the compression of end rings 6, 7. A contacting surface of a press may have substantially the same footprint as top surface 22 of end ring 6 when simultaneously impacting end rings 6, 7 and passing current therethrough. Electric current is turned off before disengaging the impacting surface to avoid arcing. Typically, electrodes 77 and impacting punches have a contacting surface containing tungsten or the like to avoid sticking against end rings 6, 7.

An induction type welding process may be optionally performed to eliminate a need to directly apply electric current to the end ring near slots 11. For example, end rings 6, 7 may be compressed by impacting, such as by a method described in FIGS. 4A-4D. Then, a current may be applied to a water-cooled induction coil (not shown) that is placed in close proximity to the outer circumference of rotor 4, whereby a large current is induced into conductor bars 8 and end rings 6, 7. In such a case, the highest resistance will be at individual ones of the interfaces having voids or gaps, and the electric current will heat/braze/weld such hot spots. Compressing by impacting may be performed before, during, and/or after the application of the inductive current. Use of inductive heating allows an impacting process to be performed without a need for electrodes that contact the outer axial end ring surfaces. As a result, for example, impacting may include impact target areas and impact times compared with some applications that utilize electrodes. Simultaneous inductive heating of conductor bar/end ring interfaces and impacting of end rings 6, 7 may utilize a press impacting surface with a footprint substantially the same as that of the target end ring 6. Inductive current may be modulated. In an exemplary embodiment, interface surfaces may be pre-coated with a brazing material and an AC current in a frequency range of, for example, 5 KHz to 5 MHz, may be applied through one or more induction coils that are in close proximity to but do not touch rotor 4. Higher frequency power acts to provide surface heating, while lower frequencies cause deeper heat penetration. Electricity at higher frequency remains in the outer "skin" of a conductor according to a formula where skin depth relates to a constant k, multiplied times the square root of the electrical resistivity divided by the relative magnetic permeability and also divided by the frequency of the induced AC current. Such may be used to calculate the depth of penetration of electric current during softening/brazing/welding at the conductor bar/end ring interface. By selecting the frequency, interface heating may be precisely placed at corresponding interface locations having a relatively large skin surface area (e.g., cavities/voids).

Control of the joining of conductor bars 8 to end rings 6, 7 may include optimizing electric current, impact force, and process times. For example, an optimized process may produce no substantial melting of material. In addition, tight operational tolerances may be met by utilizing precisely built electrodes that apply impact forces and current flow according to algorithms based on heat, material properties, measured resistances, and associated criteria. Additional precision may be obtained by use of conductor bars 8 and/or slots 11 having small protrusions/deformations for localizing heat in corresponding selected protrusion locations. Advantageously, the combination of impacting and electric current flow may be optimized in many applications to completely avoid brazing, end ring material being softened and compressed so that conductor bars 8 tightly fit and are locked in place. In such a case, brazing may be eliminated, and welding may be minimized to reduce unnecessary deformation and heat. Any number of individual impacts may be utilized. For example, a pattern of impact events may be combined with a number of electrical current type heating events, depending on the alloy or metal being used for conductors, the clearances, diameter and area of end rings, overall rotor size, conductor bar shape. Impacting and current flow may be simultaneous, whereby tension of conductor bars 8 and interface resistances may be equalized. For example, a pair of impacting surfaces may respectively face opposite axial ends of rotor 4 and act as dies and electrodes by a process of impacting end rings 6, 7, applying softening/welding electric current to the impacting surfaces, turning off the current, and retracting the impacting surfaces. Additional processing may include inducing AC current into rotor 4 at a frequency that heats uneven interface portions, followed by or simultaneously with an additional impacting step.

Figure 6A:
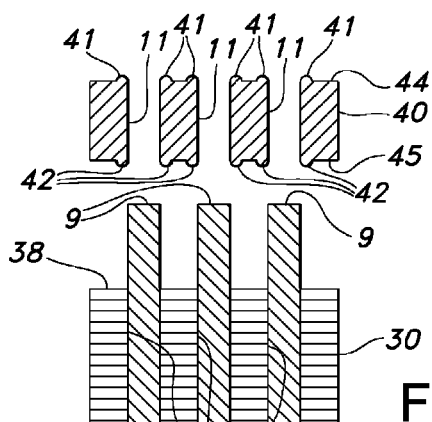
FIGS. 6A-6D show simplified cross sectional views of a portion of an induction rotor, illustrating a rotor assembly method according to an exemplary embodiment.

FIGS. 6A-6D each show a simplified cross sectional view of a portion of an induction rotor, and are provided for illustrating an assembly method according to an exemplary embodiment. Lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30. An end ring 40 has a plurality of clearance holes/slots 11 formed around a circumference thereof and aligned with corresponding channels 36 and conductor bars 8. As shown in FIG. 6A, end ring 40 has top projections 41 and bottom projections 42 respectively extending from end ring top surface 44 and end ring bottom surface 12 and formed about each end ring slot 11.

Figure 6B:
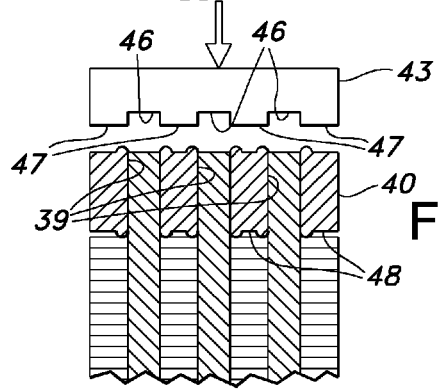

FIG. 6B shows end ring 40 placed so that conductor bars 8 pass through slots 11, whereby end ring 40 is pre-seated when bottom projections 42 of end ring 40 abuts top surface 38 of lamination stack 30. When conductor bars 8 are inserted into end ring 40, there are gaps/voids 39 in slots 11 that provide clearance between a given conductor bar 8 and slot 11. There are also spaces 48 created by bottom end ring projections 42 offsetting end ring surface 45 away from lamination stack top surface 38. When end ring 40 has been pre-seated, a punch 43 impacts top surface 44 of end ring 40. Punch 43 has cavities/indented portions 46 that are aligned with conductor bars 8 so that when punch 43 impacts end ring 40, conductor bars 8 are not directly impacted. Instead, contacting surface(s) 47 of punch 43 strikes end ring 40 and compresses end ring material, including material of projections 41, 42 into voids 39. Bottom end ring projections 42 become compressed, thereby making end ring surface 45 flush with lamination stack top surface 38. End ring 40 and conductor bars 8 are formed of a ductile material such as copper that deforms and does not significantly fracture when the force of the impacting from punch 43 is applied. The applied force exceeds the yield strength of end ring 40, whereby the copper or other material is compressed into voids 39 to significantly improve contacting between end ring 40 and individual conductor bars 8. The amount of force and velocity thereof are adjusted to optimize the filling of end ring voids 39 with the compressed copper of end ring 40.

Figure 6C:
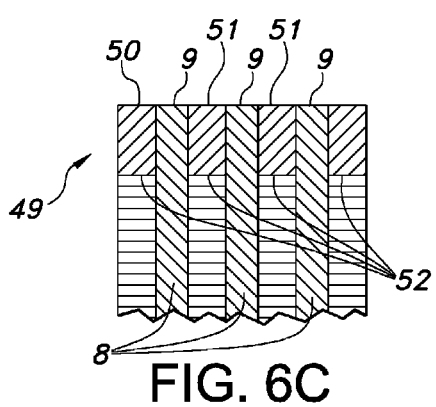
Figure 6D:
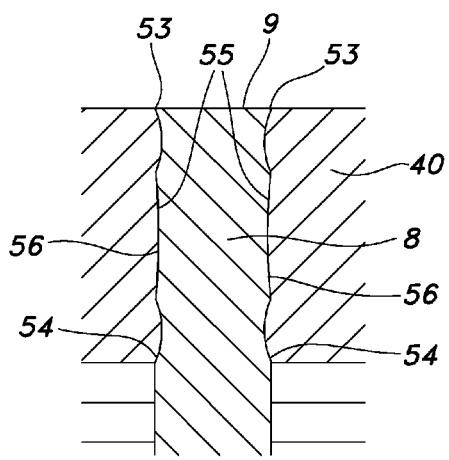
Figure 8A:
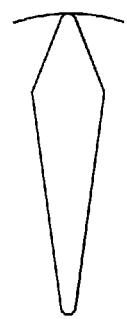
FIGS. 8A-8H are respective top plan views of exemplary conductor bar shapes that may be adapted for use with the disclosed embodiments.
Figure 8B:
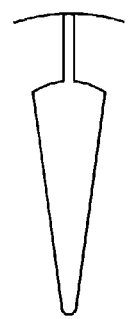
Figure 8C:
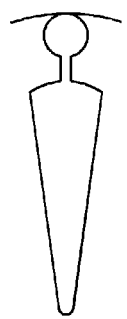
Figure 8D:
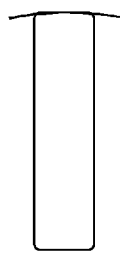
Figure 8E:
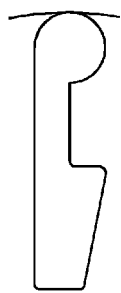
Figure 8F:
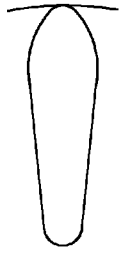
Figure 8G:
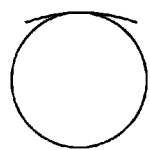
Figure 8H:
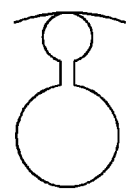

FIGS. 6C and 6D each show a simplified cross section of a portion of the resultant assembly 49 after the impacting. The compressed top surface 50 includes compressed portions 51 between adjacent conductor bars 8. The compressed top surface 50 and compressed bottom surface 52 are now flattened and the material of projections 41, 42 is now contiguous with conductor bar 8 at top end ring/conductor bar interface 53 and bottom end ring/conductor bar interface 54. In addition, the compressed main body portion 55 about a given end ring slot 11 and the compressed main body 56 of conductor bar 8 each has a more consistent cross section shape when viewed axially along the conductor bar portion from lamination stack 30 to conductor bar end 9.

FIGS. 7A-7D each show a simplified cross sectional view of a portion of an induction rotor, and are provided for illustrating an assembly method according to an exemplary embodiment. Lamination stack 30 is assembled and placed into a retaining fixture (not shown). Conductor bars 8 are inserted into lamination channels 36 and through lamination stack 30, whereby conductor bar ends 9 extend axially outward of the top surface 38 of lamination stack 30. Similarly, the opposite ends (not shown) of conductor bars 8 extend below a bottom surface (not shown) of lamination stack 30.

An end ring 6 has a plurality of clearance holes/slots 11 formed around a circumference thereof and aligned with corresponding channels 36 and conductor bars 8.

FIG. 7B shows end ring 6 placed so that conductor bars 8 pass through slots 11, whereby end ring 6 is seated when axially inward facing surface 12 of end ring 6 abuts top surface 38 of lamination stack 30. When conductor bars 8 are inserted into end ring 6, there are gaps/voids 20 in slots 11 that provide clearance between a given conductor bar 8 and slot 11. When end ring 6 has been seated and is flush with lamination stack 30, a punch 55 impacts the top surface 22 of end ring 6. Punch 55 has cavities/indented portions 56 that are aligned with conductor bars 8 so that when punch 55 impacts end ring 6, conductor bars 8 are not directly impacted. Instead, contacting surface(s) 57 of punch 55 strikes end ring 6 and compresses end ring material into voids 20. Contacting surface(s) 57 has protrusions that have a contoured shape. In FIG. 7B, the contoured shape has a raised portion, although contacting surface(s) 57 may be formed in any appropriate shape. For example, contacting surface(s) 57 may have a raised portion that approximates the shape of a target impact area 28 (e.g., FIG. 5), may include portions of various sizes and heights, may include spiked portions, may include portions structured to impact protrusions formed in end ring 6, may include alternating raised and lowered portions, may include a series of protrusions, may include protrusions that outline at least a portion of a slot 11, may be structured for compressing an end ring slot 11 having any shape, and others. A given end ring slot 11 may have a shape shown by way of non-limiting example in FIGS. 8A-8H, and corresponding contacting surface(s) 57 may, for example, have portions structured for impacting at least a portion of end ring material surrounding such slot.

FIGS. 7C and 7D each show a simplified cross section of a portion of the resultant assembly 58 after the impacting. The compressed top surface 59 includes compressed and indented portions 60 between adjacent conductor bars 8. For example, indented portion 60 may have a shape of impact area 28 shown in FIG. 5. When top surface 22 of end ring 6 is substantially flat prior to the impacting, indented portions 60 may become concave surfaces having the same shape as the corresponding contacting surface(s) 57. Indented portions 60 may partially or completely surround respective ones of slots 11. Compressed material of end ring 6 fills spaces 20 so that such material of end ring 6 is contiguous with respective conductor bars 8. The compressed main body portion 62 about a given end ring slot 11 and the compressed main body 63 of conductor bar 8 are pressed together to form a contiguous interface along the conductor bar portion from lamination stack 30 to conductor bar end 9. The compressing forces the end ring material laterally toward conductor bar 8 at upper portions 61, whereby the end ring/conductor bar interface 64 has reduced resistivity. As with other embodiments, the amount of impacting force and velocity thereof are adjusted to optimize the filling of spaces 20 with the compressed copper of end ring 6.

Any features of the disclosed embodiments may be practiced in combination with one another, depending on a particular application. The impacting of a given end ring may be performed in a single strike, in multiple strikes, in association with other induction rotor processing, or in a series of strikes as part of concurrent or independent processes. The impacting may be imposed at any angle relative to the top surface of a given end ring. For example, a contacting surface of a punch may include individual spike-shaped portions (not shown) that strike an end ring top surface in a direction toward a slot 11, such striking being at an acute angle with respect to a longitudinal axis of the induction rotor. In an exemplary embodiment, end rings 6, 7 are pressed toward one another prior to the compressing step, thereby axially biasing the stack against the end rings. As a result, a consistent and substantially uniform axially outward biasing further maintains the integrity of the induction rotor after the compressing operation because the axially outward expansion of lamination stack 30 strengthens the respective interface of conductor bars 8 and compressed slots 11.

Figure 9:
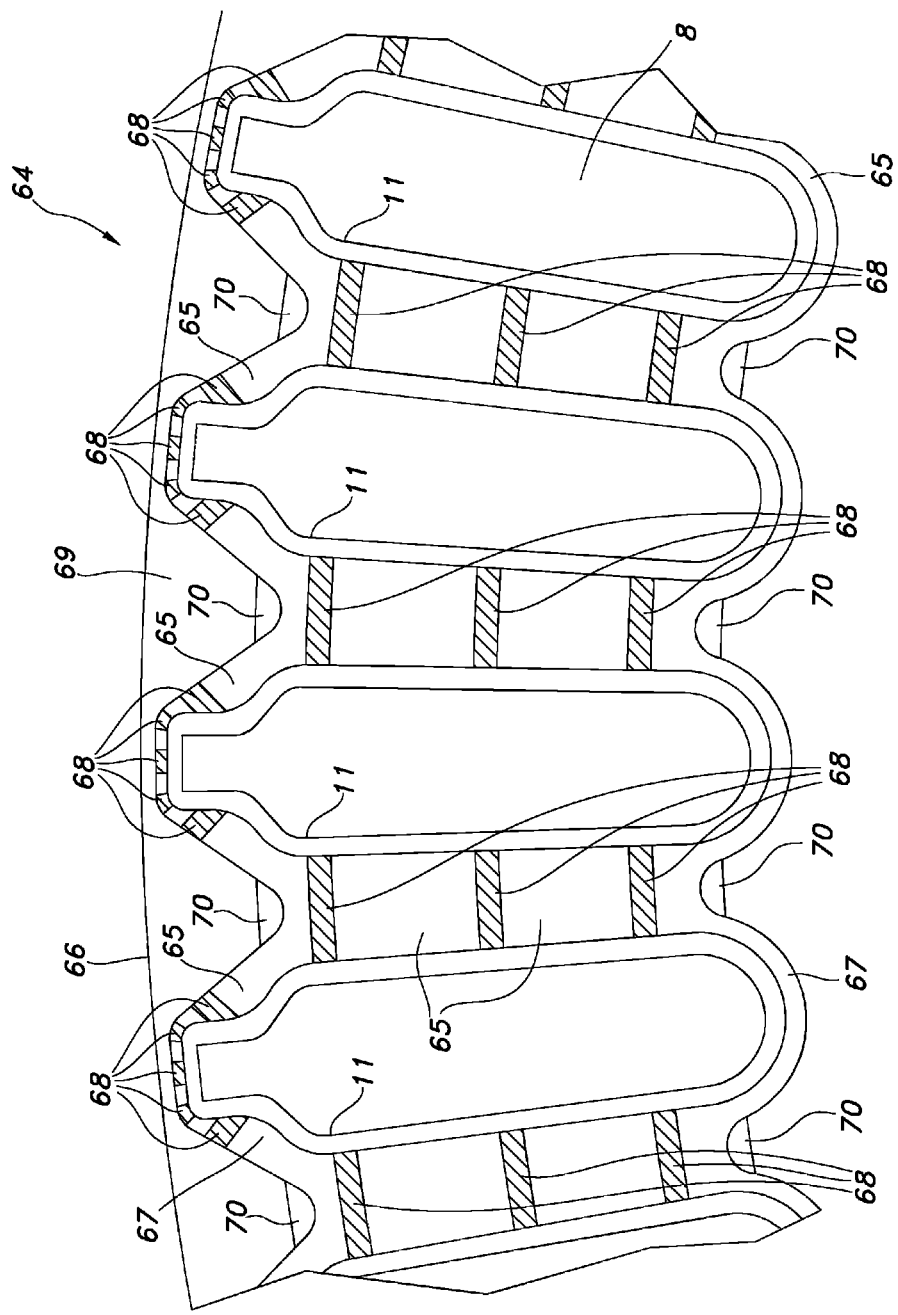
FIG. 9 is a partial top plan view of an induction rotor assembly according to an exemplary embodiment.

FIG. 9 is a partial top plan view of an exemplary embodiment of an induction rotor 64 having an end ring 66 with a top surface 69 that includes impacting target area 67. Target area 67 has protrusions/convex portions 65 that are separated by concave portions 68, whereby the impacting compresses portions 65 into portions 68, in addition to compressing end ring material against conductor bars 8, thereby selectively modulating the filling of gaps/voids between slots 11 and conductor bars 8. For example, since the space is relatively small between the outer radial perimeter of end ring 66 and the outer radial portion of conductor bar 8, a series of concave portions 68 may be spaced apart along this portion of end ring 66, whereby the impacting of target area 67 forces end ring material into concave portions 68 to provide relief and avoid excessive pressure and material at a relatively fragile portion of end ring 66. Other portions of top surface 69 may include convex portions 65 and/or portions that are neither concave nor convex. In this manner, control over compression of material may include selectively adjusting the amount of material being compressed at specific locations. Concave-convex portions may be defined in any axis, whereby relief and compression modulation may be provided for lateral as well as axial material movement. For example, partitions between convex portions 65 and concave portions 68 may be angled, and may include variations in axially extending portions of end ring slots 11 and/or protruding portions of top surface 69. In an exemplary embodiment, an axially extending groove 70 is formed in end ring 66, whereby the impacting of adjacent convex portions 65 forces end ring material in a substantially axial direction.

Contoured impact surfaces may have protrusions respectively having a protrusion volume distribution in proportion to adjacent voids between a corresponding conductor bar and slot. Similarly, a given end ring may include protrusions surrounding respective ones of slots 11, the protrusions each having a volume distribution in proportion to voids between conductor bar 8 and slot 11. Protrusions may be provided on the interior surface(s) of slots 11 and/or on interfacing portions of conductor bars 8 to provide extra heat at such protruding portions during flow of electric current.

Figure 12:
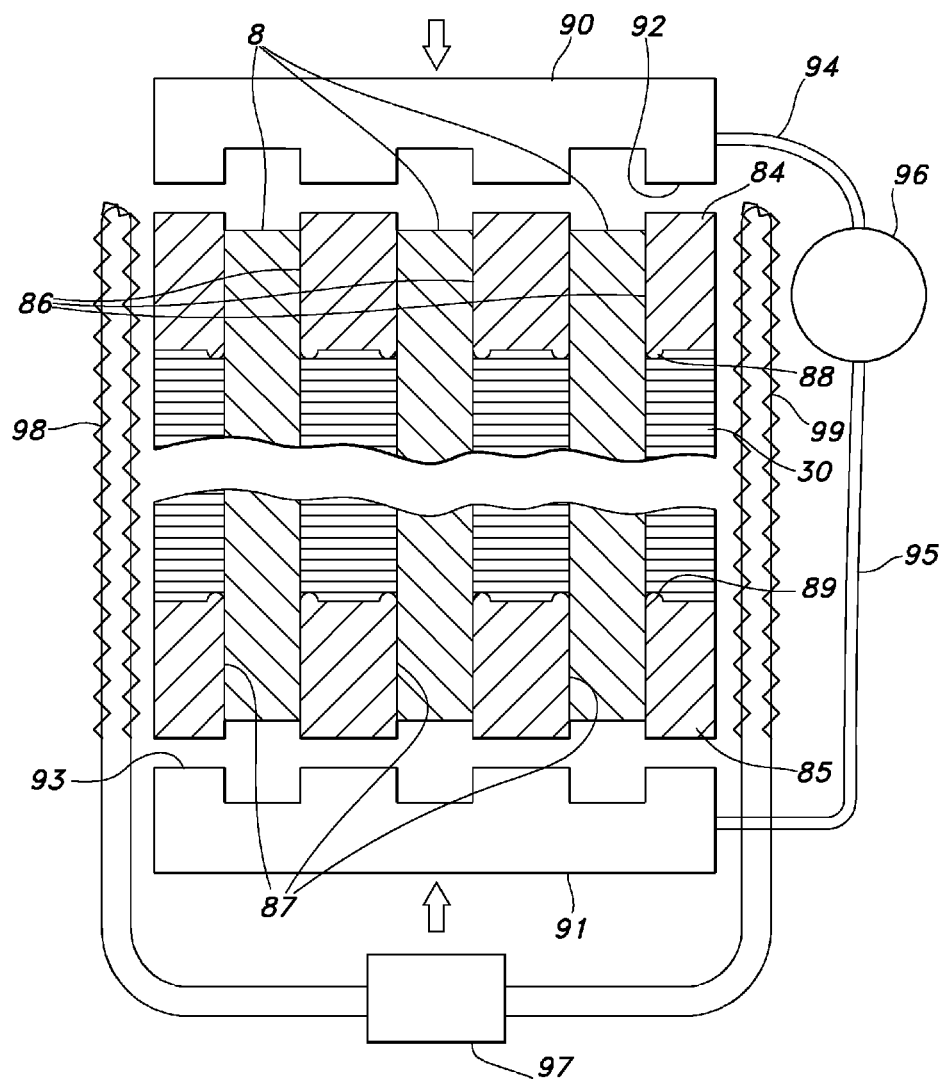
FIG. 12 is a schematic cross-sectional view provided for illustrating an assembly method according to an exemplary embodiment.

FIG. 12 is a schematic view provided for illustrating an assembly method according to an exemplary embodiment. Conductor bars 8 are inserted into lamination stack 30 in a manner as described above (e.g., FIGS. 4A-4D), and end rings 84, 85 are respectively placed at opposite axial ends so that conductor bars 8 are inserted into respective end ring slots 86, 87. Protrusions 88, 89 may be provided on selected portions of end rings 84, 85 to supply additional end ring material adjacent to slots 86, 87. Impacting heads 90, 91 are positioned so that respective impacting surfaces 92, 93 are aligned with impact target areas on end rings 84, 85. Impacting heads 90, 91 are respectively connected via insulated cables 94, 95 to the two outputs of electric power supply 96. Power supply 96 may output direct current (DC), alternating current (AC), or pulsed current, and may include electronic devices that precisely control the output by regulating voltage, current, duty cycle, frequency, waveform shape, peak and background current, phase duration, and other control parameters. A pulsed current generator 97 may be provided for powering induction primary windings 98, 99 that are arranged around the circumference of the plurality of conductor bars 8 in close proximity thereto. In operation, when end rings 84, 85 have been seated on ends of lamination stack 30, impacting heads 90, 91 impact the respective target areas of end rings 84, 85 to thereby compress end ring material against conductor bars 8 and lock end rings 84, 85 in place. Electric current is provided to impacting heads 90, 91, which act as electrodes for transferring a high current that heats high resistance portions at respective interfaces of slots 86, 87 and conductor bars 8. Such heat acts to soften the metal at the end ring/conductor bar interfaces. Impacting heads 90, 91 may optionally provide additional impacts while the electric current flows or when the electric current has been turned off. Impacting heads 90, 91 remain in contact with end rings 84, 85 at all times when electric current is turned on. Pulse generator 97 may also provide heat to high resistance portions by inducing current through conductor bars 8 and end rings 84, 85, and such induced current may have a high frequency that acts to provide heat at a depth that depends on the frequency, thereby precisely heating surface portions at the metal interfaces where voids may occur. Pulse generator 97 may be a stand-alone device or it may be a part of power supply 96. Any number of impacts may be used in conjunction with any DC and/or AC current for optimizing the engagement of conductor bars 8 and end rings 84, 85. For example, impacting and current flow may be performed as a series of events, in an alternating pattern, or simultaneously.

Individual parts of an embodiment may be utilized in any other embodiment. In addition, ancillary structure and processes may be utilized. For example, an electrode assembly may include one or more clamps for tightly securing an electrode to an end ring to minimize resistance at the electrode location. Similarly, electrodes may include spiked or angled tips for placing the electrode's contacting surface in a precise end ring location. Impacting force may be applied to a platen type impacting head as a series of individual impacts. For example, a first impact may be performed so that the impacting head remains pressed against the axial end surface of the end ring and is used as an electrode for applying electric current. Subsequent impacts may be performed by applying impacting force to the impacting head as it remains in contact with the end ring surface. In such a case, the impacting head is electrically insulated from the press. The press may be controlled to provide impacting at different force magnitudes so that bonding of the conductor bar/slot interfaces is optimized without causing unnecessary deformation. An impacting head may be implemented as any number of individual contacting surfaces. Impacting is work that generates heat, and such mechanical heat in combination with ambient heat and electrically created heat may be aggregated for optimizing the softening of metal and the bonding of end ring material to conductor bars. For example, a series of impacts may be combined with a series of electrical current pulses to soften end ring material based on the volume of material being compressed and the ambient temperature, where a heating profile may be tightly controlled and where a number of individual interface resistances may be brought within a tight tolerance by impacting and/or supplying current at lower energy levels. The assembled induction rotor has improved efficiency, performance, integrity, and reliability by virtue of having a uniformity of interface resistance that eliminates hot spots, and by the reduction or elimination of excessive heating and deformation during assembly. In addition, heat may be provided independently of the compressing and supplying of electric current, for example by heating the end rings prior to impacting.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A method of assembling an induction rotor, comprising:
   providing a plurality of longitudinally-extending conductor bars in a rotor core;
   providing first and second end rings each having a plurality of circumferentially-spaced, longitudinal slots;
   placing the first and second end rings onto respective axial ends of the core, thereby inserting ends of the conductor bars into corresponding ones of the slots in the respective end rings;
   impacting the end rings, thereby compressing the slots against the conductor bars; and
   applying an electric current through the end rings and conductor bars;
   whereby the impacting and the applying of current secures the end rings to the conductor bars.

2. The method of claim 1, wherein the impacting and the applying of current bond the end rings and conductor bars together by simultaneous mechanical and electrical heat.

3. The method of claim 1, wherein the applying of electric current includes placing electrodes between adjacent end ring slots.

4. The method of claim 3, wherein each electrode contacts respective ones of the end rings at a location of the impacting.

5. The method of claim 1, wherein the applying of electric current creates heat below a melting temperature of the end rings.

6. The method of claim 1, wherein the impacting begins after the applying of electric current has begun.

7. The method of claim 1, wherein impacting is performed after the applying of electric current has ended.

8. The method of claim 1, wherein the impacting is performed by electrodes applying the electric current.

9. The method of claim 1, wherein the applying of electric current is performed after the impacting has begun.

10. The method of claim 1, wherein the impacting includes a series of individual impacts.

11. The method of claim 1, wherein the impacting and the applying of electric current alternate.

12. The method of claim 1, wherein the applying of electric current welds the compressed slots to the conductor bars.

13. The method of claim 1, further comprising applying a brazing material proximate interfaces of the end ring slots and the conductor bars.

14. The method of claim 1, further comprising, prior to the impacting, providing a plurality of protrusions on at least one of the end rings adjacent respective ones of the slots, whereby the impacting compresses the protrusions and thereby urges the slots against corresponding ones of the conductor bars.

15. The method of claim 1, further comprising providing an impacting tool having a plurality of contoured impact surfaces, wherein the impacting includes the impact surfaces striking end ring portions adjacent the respective slots, thereby impressing the respective contours into the corresponding end ring portions.

16. The method of claim 1, wherein the compressing includes impacting each end ring outer axial face with a respective impact surface having a footprint substantially the same as that of the corresponding outer axial face.

17. The method of claim 1, further comprising selectively adjusting an amount of end ring material being compressed by providing protrusions on an end ring adjacent the slots.

18. The method of claim 1, further comprising selectively adjusting an amount of end ring material being compressed by providing protrusions on an impacting surface.

* * * * *